(12) United States Patent
Ryu et al.

(10) Patent No.: US 8,468,543 B2
(45) Date of Patent: Jun. 18, 2013

(54) SYSTEM AND METHOD FOR PREVENTING DRM CLIENT CRASH USING PROCESS SEPARATE EXECUTION

(75) Inventors: Young Sik Ryu, Seoul (KR); Kyoung Ho Jeon, Seoul (KR)

(73) Assignee: Fasoo.Com.Co.Ltd., Seoul (KR)

( * ) Notice: Subject to any disclaimer, the term of this patent is extended or adjusted under 35 U.S.C. 154(b) by 411 days.

(21) Appl. No.: 12/864,338

(22) PCT Filed: Jan. 25, 2008

(86) PCT No.: PCT/KR2008/000469
§ 371 (c)(1),
(2), (4) Date: Jul. 23, 2010

(87) PCT Pub. No.: WO2009/093768
PCT Pub. Date: Jul. 30, 2009

(65) Prior Publication Data
US 2010/0313209 A1     Dec. 9, 2010

(51) Int. Cl.
*G06F 9/54* (2006.01)
(52) U.S. Cl.
USPC ........... 719/312; 719/318; 719/319; 719/328; 718/1; 713/164; 713/165; 713/166; 713/167; 713/189
(58) Field of Classification Search
None
See application file for complete search history.

(56) References Cited

U.S. PATENT DOCUMENTS

| | | | |
|---|---|---|---|
| 6,021,438 A * | 2/2000 | Duvvoori et al. | 709/224 |
| 6,279,046 B1 * | 8/2001 | Armstrong et al. | 710/5 |
| 6,691,146 B1 * | 2/2004 | Armstrong et al. | 718/100 |
| 6,959,291 B1 * | 10/2005 | Armstrong et al. | 705/59 |
| 8,074,276 B1 * | 12/2011 | Beloussov et al. | 726/22 |
| 2002/0194389 A1 * | 12/2002 | Worley et al. | 709/310 |
| 2004/0158712 A1 | 8/2004 | Byung-Rae et al. | |
| 2004/0205203 A1 * | 10/2004 | Peinado et al. | 709/229 |
| 2005/0120160 A1 * | 6/2005 | Plouffe et al. | 711/1 |
| 2005/0138370 A1 * | 6/2005 | Goud et al. | 713/164 |
| 2005/0149726 A1 * | 7/2005 | Joshi et al. | 713/164 |

(Continued)

FOREIGN PATENT DOCUMENTS

| | | |
|---|---|---|
| EP | 1 791 071 | 5/2007 |
| KR | 10-2004-0061825 | 7/2004 |
| KR | 100784300 | 12/2007 |

OTHER PUBLICATIONS

Office Action from the Japanese Patent Office for corresponding application JP 2010-544211 and English translation.

(Continued)

*Primary Examiner* — Lechi Truong
*Assistant Examiner* — Shih-Wei Kraft
(74) *Attorney, Agent, or Firm* — Gottlieb, Rackman & Reisman, P.C.

(57) ABSTRACT

A computer system includes a DRM client system in which a plurality of DRM clients are installed, comprising: a virtual OS managing unit that separates a kernel of an actual operating system installed in the DRM client system to generate and manage a virtual operating system; a branch process information managing unit that manages branch process information according to a type of a document that a user attempts to read; and an application program branching unit that analyzes the branch process information and executes DRM client agent for managing the DRM client in an actual OS region or a virtual OS region according to the type of a document that the user attempts to read to allow the user to read the document.

13 Claims, 4 Drawing Sheets

U.S. PATENT DOCUMENTS

| | | | |
|---|---|---|---|
| 2005/0210467 A1* | 9/2005 | Zimmer et al. | 718/1 |
| 2006/0129496 A1* | 6/2006 | Chow et al. | 705/59 |
| 2006/0136694 A1* | 6/2006 | Hasbun et al. | 711/173 |
| 2006/0136720 A1 | 6/2006 | Armstrong et al. | |
| 2006/0146057 A1* | 7/2006 | Blythe | 345/506 |
| 2006/0174223 A1 | 8/2006 | Muir et al. | |
| 2007/0220246 A1* | 9/2007 | Powell et al. | 713/2 |

OTHER PUBLICATIONS

Extended European Search Report, corresponding EP Application No. 08704960.7, European Patent Office, Mar. 7, 2011.

* cited by examiner

SYSTEM AND METHOD FOR PREVENTING DRM CLIENT CRASH USING PROCESS SEPARATE EXECUTION

TECHNICAL FIELD

The present invention relates to a system and method for preventing a DRM client crash using process separate execution and, more specifically, to a system and method for preventing a crash between DRM clients by using operating system virtualization to separate and execute a process in a case where a plurality of DRM clients are used in a single PC.

BACKGROUND ART

Many systems have been established in an enterprise to allow information and knowledge to be shared, and as a consequence, distribution of documents has been briskly made. Since late 1990s when doing the Internet started to become an everyday activity, enterprises have been making an enormous investment on security in order to prevent the external leakage of the crucial company information by outside hackers.

However, the information leakage out of the company is mostly due to the carelessness or design of an insider. Accordingly, an insider threat management ("ITM") is necessary to prevent the information leakage by insiders.

Methods such as Blocking, Content Filtering, and Logging have been attempted as technical methods for the ITM. However, Blocking has a problem in that it is difficult to prevent the intentional leakage, Content Filtering has a problem in that the system capacity may be lowered and it is difficult to perform exact filtering, and Logging has a limitation of not being capable of preventing the leakage in advance as it is a postmeasure.

Recently, EDRM (Enterprise DRM) using DRM (Digital Right Management) developed to protect the copyright of content draws attention as an appropriate solution to a document security method in the enterprise, and therefore, is introduced by many advanced companies.

The basic concept of DRM is to restrict the use of contents, documents, files, and the like according to a copy right holder's intention, and this encrypts and transfers contents and defines how the contents should be used.

DRM may be classified into Consumer DRM (CDRM) and Enterprise DRM (EDRM). CDRM primarily focuses on the copyright protection of contents whereas EDRM primarily focuses on document security of a company.

EDRM maintains document security by constantly controlling users, use environments, and functions with respect to use of in-house documents.

The sub module of an EDRM product is mainly composed of a policy server that determines a security policy, a license server that issues a license, and a DRM client. The DRM client plays an important role, that is, the DRM client decrypts an encrypted file, transfers the decrypted file to a rendering application, and allows the file to be used only within a predetermined range to block the information leakage path.

A technology of realizing the DRM client may be classified into three methods, such as Embedding, Plug-in, and Overriding.

Embedding is a method of implementing DRM functions directly in source codes of the rendering application, and this is easiest to implement and has a high security level. However, Embedding has a restriction in that this may be applicable only in case of being capable of fixing the source codes.

Plug-in is a method of restricting the use of the rendering application by using APis provided from the rendering application. This has a limitation in its application since many of rendering applications do not provide the APis, and may have a weakness in security because of using public APis.

Overriding is a method of changing the execution codes of the rendering application at runtime in a memory, and this is also referred to as "Hooking" or "API Hooking". Although having many difficulties in implementation, this method has advantages of being capable of controlling any rendering applications and having superior security, and therefore, is partially or fully employed by numerous DRM vendors.

The API Hooking technology may be applied to both a user level and a kernel level of an operating system, wherein the user level is mainly used. Although various methods are included in the user level API Hooking, two types of methods, such as an IAT alteration method that alters an execution binary IAT (Import Address Table) and a code overwriting method that alters an execution binary code, are used the most because of being capable of most efficiently supporting functions required for the DRM client module.

However, as the EDRM is spread to companies, EDRMs from various DRM vendors happened to apply to a company. As DRM client modules from various DRM vendors, which have been developed by using an API Hooking technology, are installed in a single PC, a crash may occur, and this may cause it impossible to read encrypted documents, malfunction or abnormal end of an application program, malfunction of an operating system, or lowering in speed.

The above-mentioned crash takes place because of the following reasons.

The API Hooking technology such as the IA T alteration method and the code overwriting method is based on a variation of an API call path. That is, the operation of an application program is controlled by manipulating parameters and return values of an API that is called by changing and detouring a specific API call path in the call relationship between modules which belongs to the application program, and arranging the DRM client module in the detoured path.

The address value of the API to be called should be varied to change the API call path. However, a series of processes are performed as follows in the course of loading the process of an application program under control if DRM client modules from two or more different DRM vendors are installed and operated.

(1) Activation of an application process
(2) Loading of system DLL and custom DLL required for application
(3) Loading or insertion of DRM client module
(4) Alteration of API call path of modules, by DRM client modules, loaded in the corresponding application process region.

A process that each DRM client module of each DRM vendor changes an API call address value of the same specific module into its own specific function is performed in the process (4) among the above-mentioned processes, and this process is sequentially done in an order of loading each DRM client module of each DRM vendor on the application program process region. The API call address value changed with the result of the process (4) is variable according to the loading order of each DRM client of each DRM vendor and the API call address change and management method of each DRM client module. This result may lead to various problems as in Table 1.

TABLE 1

| Result of API call address change | Problems caused |
|---|---|
| (1) module loaded the latest is set to have changed address value (in case that module loaded first changes API call address values and then changed address memory region is not managed) | DRM client module loaded first is excluded from API call path not to be capable of controlling application program and thus may not open document encrypted in the format of the corresponding module vendor. |
| (2) address value changed by module loaded first is set (in case that module loaded first changes API call address values and then the whole changed API call address values are adapted not to be changed by another module) | DRM client module loaded later may not be able to alter API call path not to be capable of controlling application program and thus may not open document encrypted in the format of the corresponding module vendor |
| (3) function address values changed by module loaded first and module loaded later are mixed (in case that module loaded first changes API call address values and then only some of API call address values are applied not to be changed by another module) | * impossible to read encrypted EDRM documents* malfunction or abnormal end of application programs* malfunction or lowering in speed of operating systems |

In incidence of the above-mentioned crash, case (3) in Table 1 causes the most serious problem, the cause of which is as follows.

A few tens of APIs are used when an application program performs one operation such as "reading document", and the number of calls of the APis, although varying as the case may be, reaches a few hundreds or a few thousands. Expected parameters and return values are transferred according to a predetermined order in the course of these series of calls, so that the operation may be processed normally.

However, multiple API call address values used for an application program are mixed and varied with function address values of DRM client modules from different vendors in case (3) in Table 1, and therefore, the series of API calls that come with one operation are done between DRM client modules from different vendors that are implemented in different methods and logics, resulting in the failure of some API calls and entrance into unexpected addresses or return of unexpected parameters and result values. Therefore, any application program that is not well equipped with an exception process device in this case may give rise to a malfunction or abnormal end. In addition, incidence of the malfunction of the application program in the course of interfacing with an operating system through IPC (Inter-process Communication) may have an effect on the function of the operating system, thus leading to a malfunction of the system or lowering in speed.

As a result, it can be seen that a crash occurring when the DRM clients from various DRM vendors simultaneously operate in a single PC comes from a fact that each DRM client module employs the same technology to control the same application program process at the same time. Making only one DRM client operate when the application program process is operated, that is, making only one DRM client agent program driving and managing the DRM client operate at one time, may be considered most easily as a method to escape from such a crash. This may be done by a method of initiating and ending the DRM client agent program of each DRM vendor through a GUI (Graphical User Interface).

This is the method that was attempted two or three years ago when a crash between DRM clients were firstly issued in the domestic information security industries that commercialized and encouraged DRM solutions for the first time in the world, and this method was called "DRM agent manual switch". This method could be applied without any other additive adverse effects or problems. However, this method was not welcome by end users because of inconvenience in use that users should select and drive a DRM client agent of the vendor beforehand to read an encrypted document in the format of a specific DRM vendor and it is impossible to simultaneously read encrypted documents from various DRM vendors, and therefore, use rate of EDRM system was decreased, thus leading to a request of a further advanced method for crash avoidance.

This request created a further improved type of a crash avoidance method, in which a predetermined Active DRM vendor is set while the DRM client agents from various DRM vendors are operated at the same time and the format of a document is identified and processed at the time of a user reading the document. This method has a meaning in terms of removal of user's inconvenience because of not requiring user's additive work prior to reading of the document.

This may activate the Active DRM client to allow the document to be read without any other additive work if the document that the user attempts to read is made in the format of the current Active DRM vendor. If the document that the user attempts to read is made in the format of DRM vendors other than the Active DRM vendor, the DRM client module from the Active DRM vendor changes the other DRM vendors to be in the Active state, and then shows the user an appropriate message to induce the user to reattempt to read the document. At this time, if the user attempts to read the document again, the format of the document conforms to the Active DRM vendor, so that the user may read the document. This method is called "DRM agent semiautomatic switch".

However, the above-mentioned method has some inconveniences in that the DRM client from each vendor should be redistributed by adding a corresponding function with the aid of each DRM vendor used and document reading should be attempted after the application program is ended in a case where the format of the document that the user attempts to read does not conform to the preset Active DRM vendor, and encrypted documents from various DRM vendors are still impossible to read at the same time like in the conventional methods.

A number of different methods were designed and attempted to solve the above problems and inconveniences, one of which is directed to a method of separating and executing a process of an application program. This process separation method, which identifies the format of a document at the time of reading the document to separate and generate the process instance for each and every DRM vendor, was evaluated as a more advanced method than existing switch methods, for example, in view of being capable of reading documents from various DRM vendors at the same time. However, this method is known not to have been commercialized because of being not capable of applying to application programs that cannot create two or more process instances, having a difficulty in a process when various functions (Copy&Paste, OLE object insertion, etc.) operate using an IPC between application program processes during which documents from different DRM vendors are opened, and not guaranteeing the safety.

DISCLOSURE OF INVENTION

Technical Problem

An object of the present invention is to provide a system and method for preventing a DRM client crash that is directly applicable without any change and redistribution of DRM client modules by separating and executing a process using operating system virtualization, and does not require additional work in order to prevent a crash that may occur when DRM client modules from different DRM vendors, which have been developed using an API Hooking technology, are installed and used in a single PC.

Another object of the present invention is to provide a system and method for preventing a DRM client crash that allows documents having formats from different DRM vendors to be simultaneously read, which was impossible in the conventional methods, and may apply even to application programs that cannot create two or more process instances in a single operating system.

Technical Solution

To achieve the above objects, the system according to the present invention is characterized by a system for preventing a DRM client crash in a PC in which a plurality of different DRM clients are installed, including: a virtual OS managing unit that separates a kernel of an actual operating system installed in the PC to generate and manage a virtual operating system; a branch process information managing unit that manages branch process information according to the type of a document that a user attempts to read; and an application program branching unit that analyzes the branch process information and executes an application program in a designated OS region according to the type of a document that the user attempts to read to allow the user to read the document.

To achieve the above objects, the method according to the present invention is characterized by a method for preventing a DRM client crash in a PC in which a plurality of different DRM clients are installed, including: an OS virtualization step that separates a kernel of an actual operating system of the PC to generate a virtual operating system; a document reading attempt event generation step that attempts to read a document file in a PC in which the OS virtualization has been done; a step of transferring information on a path of the document and an application program to be executed to an application program branching unit according to the document reading attempt event; a step of querying for branch process information of the document to determine the type of the document by the application program branching unit; and a step of executing an application program in a designated OS region according to the determined type of the document to open the document by the application program branching unit.

To achieve the above objects, another method according to the present invention is characterized by a method for preventing a DRM client crash in a PC in which a plurality of different DRM clients are installed, including: an OS virtualization step that separates a kernel of an actual operating system of the PC to generate a virtual operating system; a reading attempt event generation step that attempts to read a document attached to a web page through a web browser in a PC in which the OS virtualization has been done; a step of detecting information on a path of the document attached to the web page and an application program according to the reading attempt event by an application program branching unit; a step of querying for branch process information of the document to determine the type of the document by the application program branching unit; and a step of executing an application program in a designated OS region according to the determined type of the document to open the document by the application program branching unit.

Advantageous Effects

The present invention may be directly applicable without change and redistribution of DRM client modules, and thus is fairly well economical compared to existing methods, and may be easily used without such user's additional work as the conventional methods in reading the documents from different DRM vendors.

Further, the present invention allows documents having different formats from different DRM vendors to be simultaneously read, which was impossible in the conventional methods, and may apply even to application programs that cannot create two or more process instances in a single operating system.

Moreover, the present invention may be stably operated because of not being affected in various operations using IPCs and data exchange between application programs under control since the actual operating system region and the virtual operating system region are completely separated from each other.

DESCRIPTIONS OF KEY ELEMENTS IN DRAWINGS

Figure 1:
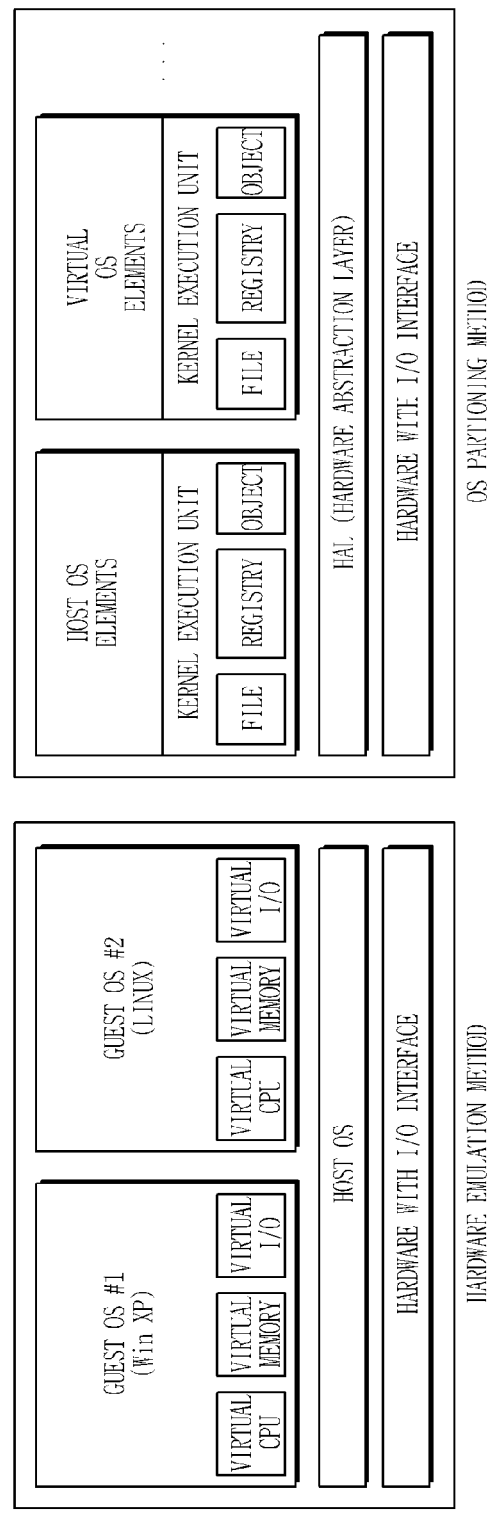
FIG. 1 is a block diagram illustrating an operating system virtualization method.

100: actual operating system
200: virtual operating system
110: DRM client of company A
120: DRM client of company B
130: virtual OS managing unit
150: application program branching unit
151: shell execute hook extension module
152: API Hooking module
160: branch process information managing unit
161: branch process information
170: IPC interface

BEST MODE FOR CARRYING OUT THE INVENTION

The present invention suggests a system and method for preventing a crash between DRM clients from two or more different DRM vendors that are installed in a single PC using operating system ("OS") virtualization.

The OS virtualization is generally separated into a hardware emulation method and an OS partitioning method.

FIG. 1 is a block diagram illustrating a system of a hardware emulation method and an OS partitioning method. Referring to FIG. 1, the hardware emulation method has a structure that VMware™ and a Guest OS are positioned on a Host OS which functions as a base, and the OS partitioning method has a structure that a virtualization space is positioned on the same line as the Host OS, with a kernel executing unit separated. Accordingly, there exist new files, registries, and objects separated from existing files, registries, and various objects in the OS partitioning method.

TABLE 2

| Item | Hardware emulation method | OS partitioning method |
|---|---|---|
| Management | OSs and applications need to be newly installed for each and every virtual OS, and this incurs lots of expenses in management and operations | OSs and applications need not be newly installed, and therefore, there is no further charging in management and operations |
| Performance | Significant load is applied to system because host OS should re-translate system call from Guest OS, and this lowers performance | This shows nearly the same performance as that of actual OS without lowering in performance because of not being Emulation method and being capable of sharing actual OS resources |
| Interlocking | Difficult to interlock between Host OS and Guest OS | Easy to interlock between actual OS and virtual OS |
| Platform | May use various types of independent OSs | May use only one type of OS |

The present invention may originally prevent interference and crashes between DRM clients from two or more different DRM vendors by generating several virtual operating system regions, which are securely isolated from each other in a sandbox type, in a single PC by the OS partitioning method among the above-described OS Virtualization methods and independently executing the DRM client modules over different OS regions.

Hereinafter, preferred embodiments of the present invention will be described in detail with reference to accompanying drawings. When it is determined that the detailed descriptions of the known techniques or structures related to the present invention depart from the scope of the invention, the detailed descriptions will be omitted.

Figure 2:
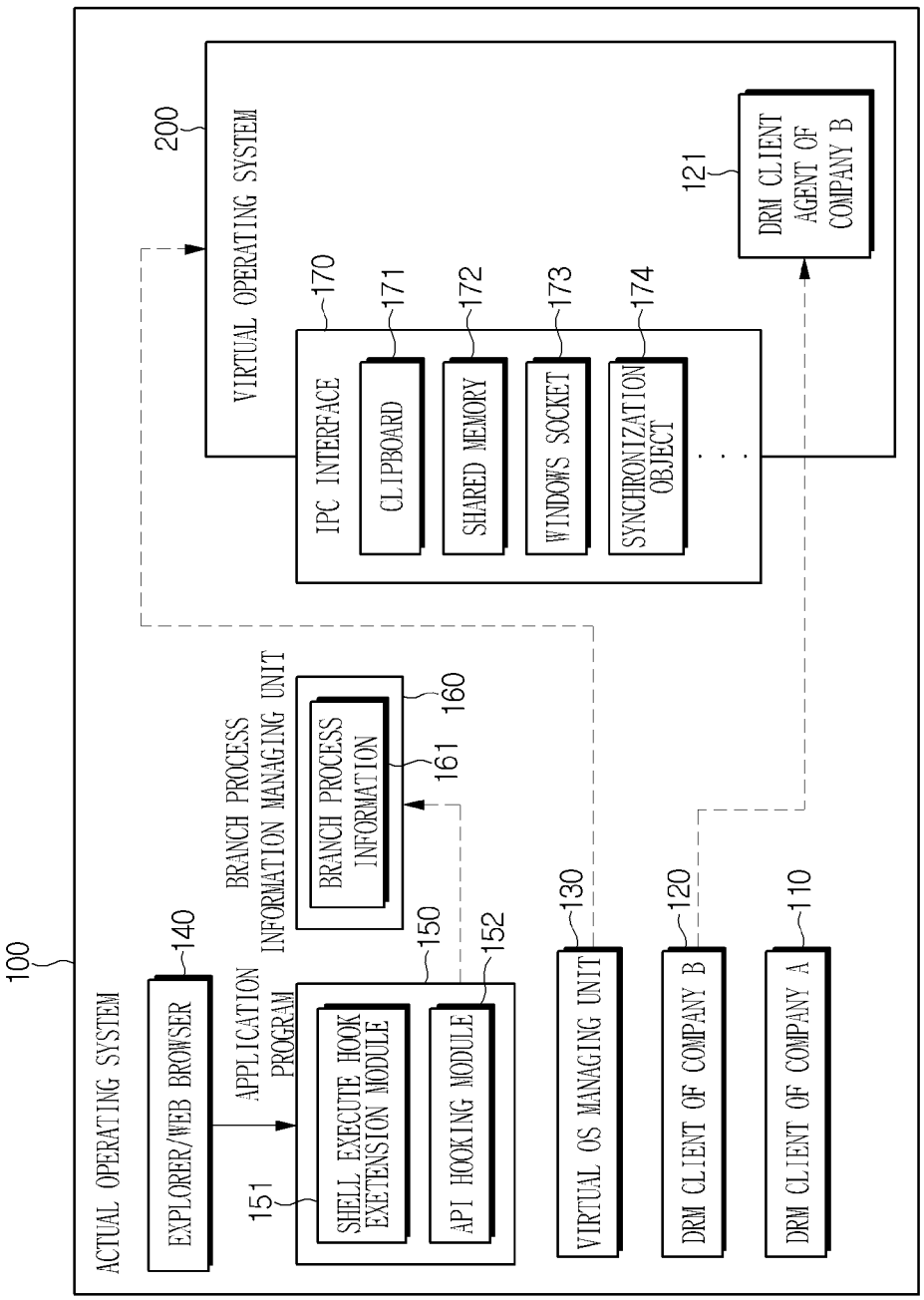
FIG. 2 is a block diagram illustrating a system according to a preferred embodiment of the present invention.

FIG. 2 is a block diagram illustrating a DRM client system according to a preferred embodiment of the present invention. Although the system has been configured in FIG. 2 under an environment where DRM clients from two different types of DRM vendors (DRM vendor A and DRM vendor B) are installed and operated in a single PC, it will be apparent to those skilled in the art that the present invention may also apply to any case where DRM clients from at least two different DRM vendors are installed and operated in a single PC.

In the meanwhile, application programs and DRM clients 110 and 120 from DRM vendor A and DRM vendor B, respectively, are all installed on an actual operating system 100 of the PC in the preferred embodiment of the present invention shown in FIG. 2.

Referring to FIG. 2, the system for preventing a DRM client crash using OS virtualization according to the present invention generally includes a virtual OS managing unit 130, a branch process information managing unit 160, and an application program branching unit 150, and may further include an IPC interface 170.

The virtual OS managing unit 130 separates the kernel of the actual operating system 100 installed in the PC by the above-described OS partitioning method to generate and manage the virtual operating system 200. At this time, it is preferred that the virtual operating system 200 is generated upon a boot of the PC or at any appropriate time similar to this.

In addition, the number of the virtual operating systems 200 to be generated is not particularly restricted, but preferred to correspond to the number of the DRM clients further installed in the PC. For instance, it is preferred to generate two virtual operating systems so that there are included one actual operating system and two virtual operating systems if three different DRM clients are installed in the PC.

In the meanwhile, the virtual OS managing unit 130 may have a function to end the application program under operation over the virtual operating system 200.

The branch process information managing unit 160 manages branch process Information 161 so that the application program branching unit 150 branch-processes the execution region of the application program according to the type of a document that a user attempts to read.

The branch process information 161 includes branch object application program, a document type, and execution OS region information. In addition, the branch process information 161 is defined in XML and encrypted for management.

The branch object application program information may include a branch object application program name and an execution file name (for example, Winword.exe), and the document type may be defined and configured, for example, in such a manner that 1=general document, 2=encrypted document of DRM vendor A, and 3=encrypted document of DRM vendor B. And, the execution OS region information may be defined and configured, for example, as ROS in case of an actual OS region and as VOS#1 and VOS#2 according to the number of generated virtual OSs in case of a virtual OS region.

As an example, the branch process information 161 may be defined as follows in a case where the branch object application program is MS office word of Microsoft™ corporation, the document type is an encrypted document of DRM vendor B, and the execution OS region is virtual OS region #1.

```
<APPLICATION name="winword.exe">
<DISPLAY_NAME>MS Office Word</DISPLAY_NAME>
<MACHINE_TYPE>VOS#1</MACHINE_TYPE>
<EXECUTE_TYPE>3</EXECUTE_TYPE>
</APPLICATION>
```

The application program branching unit 150 is an application program execution branch process module that queries for the branch process information 161 according to the type of a document (for example, a general document, an encrypted document of DRM vendor A, and an encrypted document of DRM vendor B) when a user attempts to read the document, and executes the application program in a designated OS region (actual OS region or virtual OS region) to allow the user to read the document.

For instance, the application program branching unit 150 activates a DRM client agent 121, which drives and manages a DRM client, in the region of the virtual OS 200 so that the application program is executed in the region of the virtual operating system 200 when the encrypted document of DRM vendor B intends to be read as shown in FIG. 2.

In a case where the document intends to be read through the Explorer, the application program branching unit 150 is implemented as an extension module by using a Shell execute hook interface (IShellExecuteHook) among Shell interfaces provided by MS Windows™.

The Shell execute hook interface is an interface provided to generate an event when a program is executed through a Windows™ Shell (Explorer, Desktop, etc.) so that a developer may add a function, and this is one of Windows™ Shell extension functions that transfers detailed information of a program execution command to an extension module that implements IShellExecuteHook when a program execution request is made through the Explorer, Desktop, or system menu and the extension module queries, changes, or cancels the execution information according to the purpose so that the program may be executed or its execution may be canceled according to the developer's intention.

In the meanwhile, the application program branching unit 150 monitors the file input/output (110) of the web browser using an API Hooking technology when a document attached to a web page intends to be read through the web browser, and determines the type of the document to implement a module to execute the application program in the designated OS region when an event occurs that intends to read the document (file) attached to the web page.

Accordingly, the application program branching unit 150 includes a Shell execute hook extension module 151 for reading a document through the Explorer and an API Hooking module 152 for reading a document through the web browser.

The IPC interface 170 enables communication to be done between application program processes that are executed in the actual OS region and the virtual OS region, respectively, according to the type of the document. Accordingly, functions such as Copy/Paste may be used for editing a document between the application program processes that are executed in the actual OS region and the virtual OS region, respectively, through the IPC interface 170.

The IPC interface 170 may be implemented through a clipboard 171, a shared memory 172, a Windows™ socket 173, a synchronization object 174, and the like.

Figure 3:
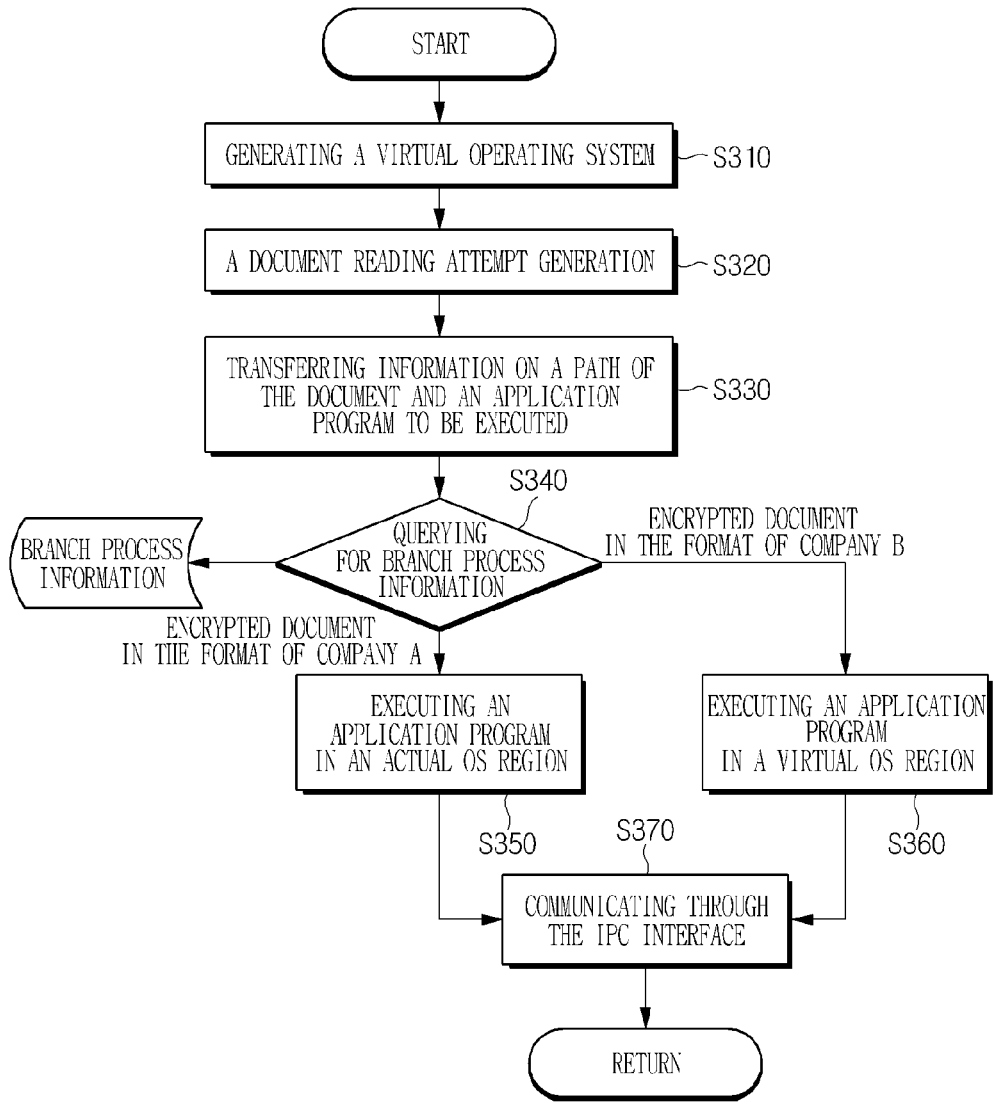
FIG. 3 is a flowchart illustrating a method for preventing a DRM client crash in reading a document through the Explorer according to a preferred embodiment of the present invention.
Figure 4:
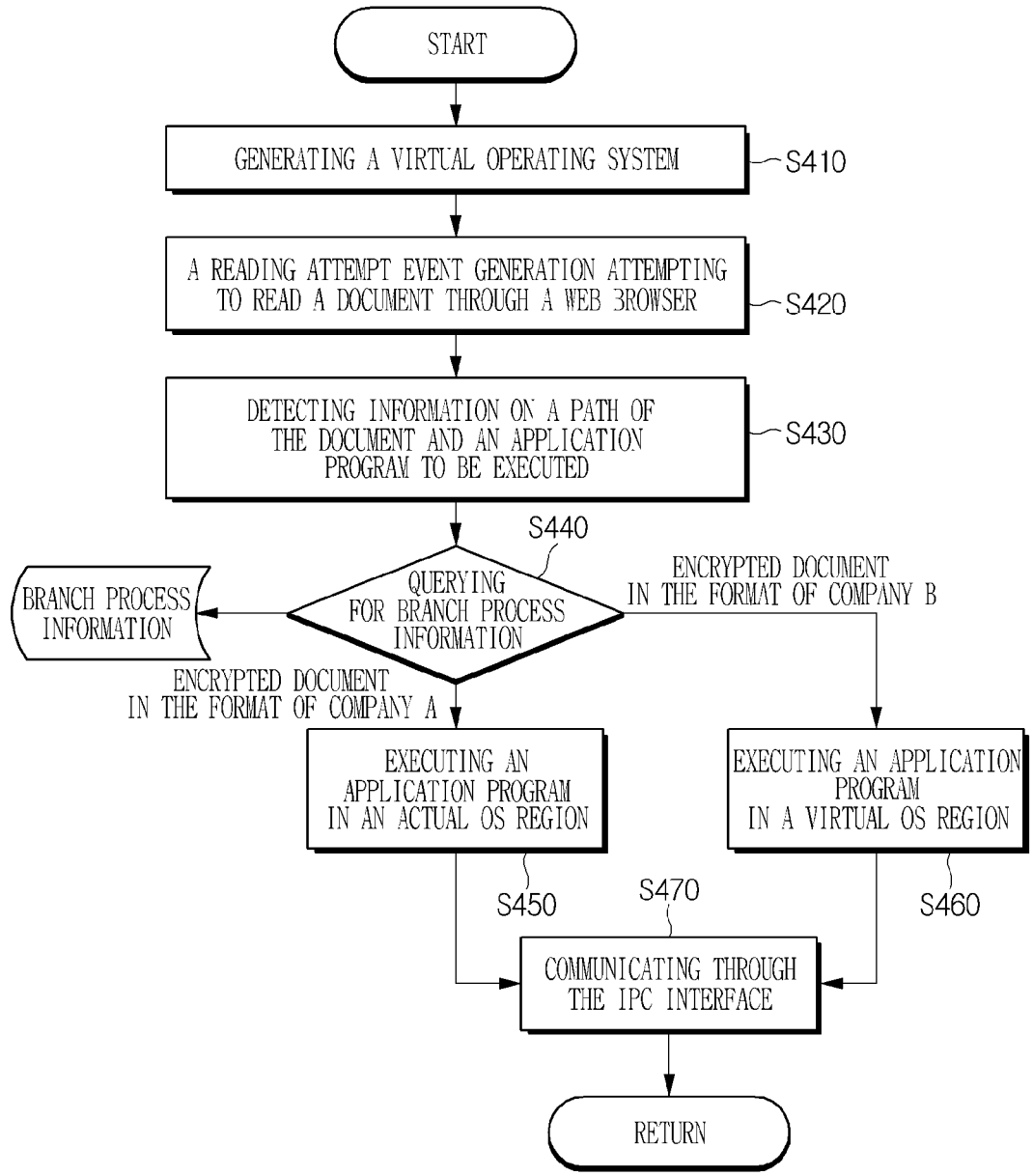
FIG. 4 is a flowchart illustrating a method for preventing a DRM client crash in reading a document through a web browser according to a preferred embodiment of the present invention.

FIG. 3 is a flowchart illustrating a method for preventing a DRM client crash according to a preferred embodiment of the present invention, in a case where a document in the PC intends to be read through the Explorer, and FIG. 4 is a flowchart illustrating a method for preventing a DRM client crash according to a preferred embodiment of the present invention, in a case where a document intends to be read through the web browser.

Although it has been assumed in FIGS. 3 and 4 that only the application programs that is not subjected to a branch are executed or general documents or encrypted documents of DRM vendor A are executed in the actual OS region as they are, and encrypted documents of DRM vendor B are executed in the virtual OS region, the OS region where each of them is to be executed may be arbitrarily varied according to the branch process information 161.

Referring to FIG. 3, firstly, the virtual OS managing unit 130 separates the kernel of the actual operating system 100 of the PC according to the OS partitioning method to generate the virtual operating system 200 (S310). At this time, it is preferred that the virtual operating system 200 is generated upon a boot of the PC or at the appropriate time similar to this.

In the meanwhile, although the number of the virtual operating systems 200 to be generated is not particularly restricted, it is preferred to correspond to the number of the DRM clients that are additionally installed in the PC. For instance, it is preferred to generate two virtual operating systems so that there are provided one actual operating system and two virtual operating systems if three different DRM clients are installed in the PC.

If an event is generated that intends to read a document through the Explorer after the virtual operating system 200 has been generated (for example, by double-clicking on the document or selecting and entering the document) (S320), a path of the document and an application program to be executed are transferred to the Shell execute hook extension module 151 of the application program branching unit 150 (S330).

The Shell execute hook extension module 151 queries for the branch process information 161 of the document to determine which type the document belongs to (for example, a general document, an encrypted document of DRM vendor A, and an encrypted document of DRM vendor B) (S340).

The branch process information 161, which is managed by the branch process information managing unit 160, includes a branch object application program, a document type, and execution OS region information. The branch process information 161 is defined in XML and encrypted for management.

If the application program that is not subjected to a branch is executed or the document is a general document or encrypted document of DRM vendor A as the result of determination, the application program is executed in the actual operating system 100 as it is (S350). Accordingly, the application program is executed in the actual OS region to open the document.

If the document is an encrypted document of DRM vendor B as the result of determination, the Shell execute hook extension module 151 interrupts the application program to be executed in the region of the actual operating system 100 and executes a command that enables the document to be opened through the application program in the region of the virtual operating system 200, and therefore, the application program is executed in the region of the virtual operating system 200 to open the document (S360).

In the meanwhile, communication may be made through the IPC interface 170 between the application program processes that are executed in the actual OS region and the virtual OS region, respectively, according to the type of the document (S370). Accordingly, functions such as Copy/Paste may be used for editing a document between the application program processes that are executed in the actual OS region and the virtual OS region, respectively.

The IPC interface 170 may be implemented through the clipboard 171, the shared memory 172, the Windows™ socket 173, the synchronization socket 174, and the like.

Referring to FIG. 4, firstly, the virtual OS managing unit 130 separates the kernel of the actual operating system 100 of the PC according to the OS partitioning method to generate the virtual operating system 200 (S410). At this time, it is preferred that the virtual operating system 200 is generated upon a boot of the PC or at the appropriate time similar to this.

In the meanwhile, although the number of the virtual operating systems 200 to be generated is not particularly restricted, it is preferred to correspond to the number of the DRM clients that are additionally installed in the PC. For instance, it is preferred to generate two virtual operating systems so that there are provided one actual operating system and two virtual operating systems if three different DRM clients are installed in the PC.

If an event is generated that intends to read a document attached to the web browser 140 through the web browser 140 after the virtual operating system 200 has been generated (S420), the API Hooking module 152 of the application program branching unit 150 that operates over the web browser 140 detects the path of the document and an application program to be executed (S430).

The API Hooking module 152 queries for the branch process information 161 of the document to determine which type the document belongs to (for example, a general document, an encrypted document of DRM vendor A, and an encrypted document of DRM vendor B) (S440).

The branch process information 161, which is managed by the branch process information managing unit 160, includes a branch object application program, a document type, and execution OS region information. The branch process information 161 is defined in XML and encrypted for management.

If the application program that is not subjected to a branch is executed or the document is a general document or encrypted document of DRM vendor A as the result of determination, the application program is executed in the actual operating system 100 as it is (S450). Accordingly, the application program is executed in the actual OS region to open the document.

If the document is an encrypted document of DRM vendor B as the result of determination, the API Hooking module 152 interrupts the application program to be executed in the region of the actual operating system 100 and executes a command that enables the document to be opened through the application program in the region of the virtual operating system 200, and therefore, the application program is executed in the region of the virtual operating system 200 to open the document (S460).

In the meanwhile, communication may be made through the IPC interface 170 between the application program processes that are executed in the actual OS region and the virtual OS region, respectively, according to the type of the document (S470). Accordingly, functions such as Copy/Paste may be used for editing a document between the application program processes that are executed in the actual OS region and the virtual OS region, respectively.

The IPC interface 170 may be implemented through the clipboard 171, the shared memory 172, the Windows™ socket 173, the synchronization object 174, and the like.

The invention claimed is:

1. A computer program product embedded in a non-transitory computer readable medium, the medium storing a Digital Right Management client system including a plurality of Digital Right Management clients, the Digital Right Management client system comprising:
   a virtual Operating System managing unit stored in a memory that separates a kernel of an actual operating system installed in the Digital Right Management client system to generate and manage a virtual operating system;
   a branch process information managing unit stored in the memory that manages branch process information according to a type of a document that a user attempts to read;
   an application program branching unit stored in the memory that analyzes the branch process information and executes a Digital Right Management client agent for managing a Digital Right Management client in an actual operating system region or a virtual operating system region according to the type of a document that the user attempts to read to allow the user to read the document;
   wherein a number of virtual operating systems to be generated corresponds to a number of Digital Right Management clients installed in the Digital Right Management client system;
   wherein the branch process information includes first information for determining a document type according to a document encryption method and second information for determining an execution operating system region in which the Digital Right Management client agent is executed according to the document type;
   an inter-process communication interface that performs communication between Digital Right Management client agent processes that are executed in the actual operating system region and the virtual operating system region, respectively, according to the type of the document;
   wherein the plurality of Digital Right Management clients include a first through an nth Digital Right Management clients for reading a first through an nth encrypted documents, and wherein the virtual operating system managing unit generates (n−1) virtual operating systems according to the n Digital Right Management clients (n is an integer same with or greater than 1); and
   wherein the application program branching unit executes the Digital Right Management client agent in the actual operating system region when the document that the user attempts to read is a first encrypted document, and the application program branching unit executes the Digital Right Management client agent in the (k−1) virtual operating system region when the document that the user attempts to read is a kth encrypted document (k is an integer same with or greater than 2 and same with or smaller than n).

2. The system of claim 1, wherein the inter-process communication interface includes at least one of a clipboard, a shared memory, an operating system socket, and a synchronization object.

3. The system of claim 1, wherein the branch process information is defined in Extensible Markup Language and encrypted for management.

4. The system of claim 1, wherein the application program branching unit includes a Shell execute hook extension module and an Application Programming Interface Hooking module.

5. A method for operating a Digital Right Management client system in which a plurality of Digital Right Management clients are installed, comprising:
   an operating system virtualization step that separates a kernel of an actual operating system of the Digital Right Management client system to generate a virtual operating system;
   a document reading attempt event generation step that attempts to read a document;
   a step of transferring branch process information corresponding to a type of the document that a user attempts to read to an application program branching unit according to the document reading attempt event;
   a step of analyzing the branch process information to determine the type of the document by the application program branching unit; and
   a step of executing a Digital Right Management client agent for managing a Digital Right Management client in an actual operating system region or a virtual operating system region according to the determined type of the document to open the document by the application program branching unit;
   wherein a number of virtual operating systems to be generated corresponds to a number of Digital Right Management clients installed in the Digital Right Management client system;
   wherein the branch process information includes first information for determining a document type according to a document encryption method and second information for determining an execution operating system region in which the Digital Right Management client agent is executed according to the document type;

a step of performing communication through an inter-process communication interface between Digital Right Management client agent processes that are executed in the actual operating system region and the virtual operating system region, respectively, after the execution of the Digital Right Management client in a designated operating system region according to the type of the document;

wherein the plurality of Digital Right Management clients include a first through an nth Digital Right Management clients for reading a first through an nth encrypted documents, and wherein the virtual operating system managing unit generates (n−1) virtual operating systems according to the n Digital Right Management clients (n is an integer same with or greater than 1); and wherein the application program branching unit executes the Digital Right Management client agent in the actual operating system region when the document that the user attempts to read is a first encrypted document, and the application program branching unit executes the Digital Right Management client agent in the (k−1) virtual operating system region when the document that the user attempts to read is a kth encrypted document (k is an integer same with or greater than 2 and same with or smaller than n).

6. The method of claim 5, wherein the inter-process communication interface includes at least one of a clipboard, a shared memory, an operating system socket, and a synchronization object.

7. The method of claim 5, wherein the branch process information includes information related to a branch object application program, a document type, and an execution operating system region.

8. The method of claim 7, wherein the branch process information is defined in Extensible Markup Language and encrypted for management.

9. The method of claim 5, wherein the document is a file stored in the Digital Right Management client system in which the operating system virtualization has been done, and wherein the application program branching unit is implemented as an extension module using an Shell execute hook interface (IShellExecuteHook).

10. The method of claim 5, wherein the document is a file attached to a web page through a web browser in the Digital Right Management client system in which the operating system virtualization has been done, and wherein the branch process information is detected by the application program branching unit and transferred to the application program branching unit.

11. The method of claim 10, wherein the application program branching unit is implemented as a module using an Application Programming Interface Hooking technology.

12. A computer program product embedded on a non-transitory computer readable medium, the medium storing a Digital Right Management client system including a plurality of Digital Right Management client units, the Digital Right Management client system comprising:

a first Digital Right Management client unit installed in an actual operating system of the Digital Right Management client system and configured to read a first encrypted document;

a second Digital Right Management client unit installed in the actual operating system of the Digital Right Management client system and configured to read a second encrypted document;

a virtual operating system managing unit that separates a kernel of the actual operating system and generates a virtual operating system in which a Digital Right Management client agent related to at least one of the first and second Digital Right Management client units is executed;

a branch process information managing unit that manages branch process information according to a type of a document that a user attempts to read;

an application program branching unit that analyzes the branch process information and executes the Digital Right Management client agent in the actual operating system or the virtual operating system according to the type of the document that the user attempts to read, wherein a first Digital Right Management client agent related to the first Digital Right Management client unit is executed in the actual operating system when the document is the first encrypted document, and a second Digital Right Management client agent related to the second Digital Right Management client unit is executed in the virtual operating system when the document is the second encrypted document;

wherein a number of virtual operating systems to be generated corresponds to a number of Digital Right Management client units installed in the Digital Right Management client system;

wherein the branch process information includes first information for determining a document type according to a document encryption method and second information for determining an execution operating system region in which the Digital Right Management client agent is executed according to the document type;

an inter-process communication interface that performs communication between Digital Right Management client agent processes that are executed in the actual operating system region and the virtual operating system region, respectively, according to the type of the document;

wherein the plurality of Digital Right Management client units include a first through an nth Digital Right Management client units for reading a first through an nth encrypted documents, and wherein the virtual operating system managing unit generates (n−1) virtual operating systems according to the n Digital Right Management client units (n is an integer same with or greater than 1); and wherein the application program branching unit executes the Digital Right Management client agent in the actual operating system region when the document that the user attempts to read is a first encrypted document, and the application program branching unit executes the Digital Right Management client agent in the (k−1) virtual operating system region when the document that the user attempts to read is a kth encrypted document (k is an integer same with or greater than 2 and same with or smaller than n).

13. The system of claim 12, wherein the virtual operating system managing unit generates the virtual operating system when a boot of the Digital Right Management client system is executed.

* * * * *